(12) United States Patent
Fehnker et al.

(10) Patent No.: US 8,296,735 B2
(45) Date of Patent: Oct. 23, 2012

(54) INTER-PROCEDURAL ANALYSIS OF COMPUTER PROGRAMS

(75) Inventors: Ansgar Fehnker, Erskineville (AU); Clemens Dubslaff, Jena (DE)

(73) Assignee: National ICT Australia Limited, Eveleigh, NSW (AU)

( * ) Notice: Subject to any disclaimer, the term of this patent is extended or adjusted under 35 U.S.C. 154(b) by 451 days.

(21) Appl. No.: 12/709,053

(22) Filed: Feb. 19, 2010

(65) Prior Publication Data

US 2011/0209126 A1 Aug. 25, 2011

(51) Int. Cl.
*G06F 9/44* (2006.01)
*G06F 9/45* (2006.01)

(52) U.S. Cl. ........ 717/124; 717/106; 717/127; 717/128; 717/137

(58) Field of Classification Search .................. None
See application file for complete search history.

(56) References Cited

U.S. PATENT DOCUMENTS 7,146,605 B2 * 12/2006 Beer et al. .................. 717/126
7,926,043 B2 * 4/2011 Vaswani et al. ............ 717/130

OTHER PUBLICATIONS

Edmund M. Clarke et al., "Design and Synthesis of Synchronization Skeletons using Branching Time Temporal Logic", Dexter Kozen, editor, Logics of Programs Workshop, IBM Watson Research Center, New York, May 1981, 67 pages.
D. Dams et al., Orion: High- Precision Methods for State Error Analysis of C and C++ Programs, Bell Labs Tech., Mem. 1TD-04-452-63Z., Lucent Technologies, 2004, 23 pages.
A. Fehnker et al., "Model Checking Software at Compile Time", In Proc. Theoretical Aspects of Software Engineering, Jun. 6-8, 2007, IEEE Computer Society, China, 10 pages.
G.J. Holzmann, "Static Source Code Checking for User-Defined Properties", In Proc. Integrated Design and Process Technology, IDPT-2002, Pasadena, California, Jun. 2002, 9 pages.
J.P. Queille et al., "Specification and Verification of Concurrent Systems in Cesar", Proc. Intl. Symposium on Programming, Turin, Apr. 6-8, 1982, pp. 337-351.
D. Schmidt et al., "Program Analysis as Model Checking of Abstract Interpretations", In Proc. SAS, 1998, pp. 351-380.

* cited by examiner

*Primary Examiner* — Chuck Kendall

(57) ABSTRACT

This invention concerns inter-procedural analysis of computer programs. The need for inter-procedural analysis arises, for instance, where information is to be passed across the boundaries between functions; for example, by passing a pointer of variables to another function. The pointer needs to identify a valid memory location when used by a calling function. In one aspect the invention is a method and in another aspect the invention is a computer programmed to perform the method. The heart of the method involves the use of computational tree logic (CTL) model checking each substructure of the code to iteratively check alternately whether guarantees associated with the code are true, false or undetermined for each external assumption, and whether the internal assumptions are consistent with the guarantees of the caller sub-structures.

8 Claims, 10 Drawing Sheets

```
int main(){
  int *p=malloc();
  f1(p);
  return 1;
}
```

```
int f1(int *q){
  f2(q);
  free(q);
  return 1;
}
```

```
int f2 (int *r){
  *r = 4;
  free(r)
  return 1;
}
```

```
           not
            |
            EU
true ——    |
            not
            |
            or
not ——    |
 |          not
free(p)    |
           !
not ——    EU
 |         |
alloc(p)   free(p)
```

```
           not
            |
            EU
true ——    |
            not
            |
            or
not ——    |
 |          not
free(q)    |
            |
not ——    EU
 |         |
alloc(q)   free(q)
```

```
           not
            |
            EU
true ——    |
            not
            |
            or
not ——    |
 |          not
free(r)    !

not ——    EU
 |         |
alloc(r)   free(r)
```

Fig. 11

INTER-PROCEDURAL ANALYSIS OF COMPUTER PROGRAMS

TECHNICAL FIELD

This invention concerns inter-procedural analysis of computer programs. The need for inter-procedural analysis arises, for instance, where information is to be passed across the boundaries between functions; for example, by passing a pointer of variables to another function. The pointer needs to identify a valid memory location when used by a calling function.

BACKGROUND ART

Software product development is driven by two objectives: Short time-to-market and low development costs. Nevertheless, the current best practice of software development is time consuming, and creates unnecessary expense. It is frequently only in the later stages of product development, or even after product deployment, that additional expense visible. For instance because software bugs remain in the code, and only come to light after the software is in use. Such bugs are time consuming to detect. Finding software bugs, and providing assurance of their absence, is therefore of great importance in software development.

In contrast to equation solving approaches to static analysis, an 'automata based' approach defines properties in terms of temporal logic expressions over annotated graphs, see references [4, 2, 6]. The validity of a property can then be checked automatically by graph exploring techniques such as model checking, see references [1, 5].

The basic approach is to map a C/C++ program to its corresponding control flow graph (CFG), and to label the CFG with occurrences of syntactic constructs of interest; such as those that pass pointers of variables. The CFG together with the labels are then mapped to the input language of a model checker or directly translated into a Kripke structure for model checking, A Kripke structure is a set of labeled states, equipped with a (total) transition relation. This framework can be applied to the analysis of individual functions of a C/C++ program.

DISCLOSURE OF THE INVENTION

In a first aspect the invention is a computer method for the inter-procedural checking of source code, comprising:
   Receiving source code comprising a list of functions.
   Expressing a required inter-procedural check as a formula expressed in computational tree logic (CTL) syntax.
   Decomposing the computational tree logic (CTL) syntax of the inter-procedural check into sub-formulae.
   Automatically mapping the functions of the source code to respective sub-structures of an associated recursive Kripke structure, wherein the sub-structures call other substructures, and wherein each sub-structure comprises the following states:
   An entry location having internal guarantees.
   Other locations representing code statements having respective internal guarantees.
   Boxes that model calls to other functions, having respective internal assumptions and external guarantees.
   And, an exit location having internal guarantees and external assumptions. Wherein there are transitions between adjacent locations and boxes that map a value from an precursor location or box to a successor location or box.
   Generating a summary for each substructure capable of being represented as a table wherein each row represents a location, box or the external assumptions of the substructure, and wherein each row comprises three values that respectively represent:
      Whether the summary is an assumption for a box, a guarantee for a location or external assumptions.
      Whether the current sub-formula is true, false or undetermined at that state when a first external assumption of that substructure is assumed to be false.
      And whether the current sub-formula is true, false or undetermined at that state when the other external assumption of that substructure is assumed to be true.
   Then, starting with the simplest sub-formula, refining the summaries by:
   (i) applying computational tree logic (CTL) model checking to each sub-structure to check whether the each guarantee is true, false or undetermined for each external assumption and updating the corresponding values of the summary accordingly. Then,
   (ii) checking whether the internal assumptions of each box are consistent with the first internal guarantees of the callee sub-structure, and whether the external assumptions are consistent with the external guarantees of the caller sub-structure and updating the corresponding values of the summary accordingly. Then,
   (iii) iteratively repeating steps (i) and (ii) until no further refinement of the sub-formula is possible.
   Then iteratively repeating steps (i), (ii) and (iii) for each sub-formula in increasing complexity, until no further refining is possible for the most complex sub-formula, and therefore the entire formula.

The method terminates, when all summaries are 'maximally coherent' and 'consistent'. At this point the model checking is completed, and it can be concluded whether the checking formula is valid for the RKS or not. This result then points to the presence of absence of potential bugs in the source code.

After the method terminates there may be some values in the summary that have not been resolved as true or false, but remain undetermined. These may then be resolved by applying rules to allocate true or false values.

The method essentially transforms the source code into summaries that indicate the presence of bugs in the source code.

Initialization of the method may involve setting the value of every state of the summary to 'undetermined'.

When checking involves nested formulae it may be necessary for the single values true, false and undetermined may each be replaced by a set of values that also record the callee sub-structure. In this way it is possible to record which sub-structure has been called with which assumption.

When checking involves nest formulae new substructures may be generated from the summaries, one for each column in the table. In this case the method may make use of an additional step of introducing new sets of values having more values. It will then also be necessary to combine two sub-formulas to make a combined summary which is the product of the summaries for the same sub-structure. In this case the method may also make use of an additional step of merging sets of values into sets with fewer values.

The invention addresses the problem that bugs can be caused by a combination of programming constructs that occur distributed over several functions and procedures in the code. The invention supports the specification of checks based on syntactic patterns in the code that are not restricted to the analysis of pointers.

Checking of sub-formulae when there are nested formulae may involve the steps of checking the sub-formulae bottom up from atomic propositions to the complete formula.

In another aspect the invention is a computer programmed to conduct inter-procedural checking of source code, comprising:

An input port to receive source code comprising a list of functions.

A processor to:

Express a required inter-procedural check as a formula expressed in computational tree logic (CTL) syntax.

Decompose the computational tree logic (CTL) syntax of the inter-procedural check into sub-formulae.

Automatically map the functions of the source code to respective sub-structures of an associated recursive Kripke structure, wherein the sub-structures call other substructures, and wherein each sub-structure comprises the following states:

An entry location having internal guarantees.

Other locations representing code statements having respective internal guarantees.

Boxes that model calls to other functions, having respective internal assumptions and external guarantees.

And, an exit location having internal guarantees and external assumptions. Wherein there are transitions between adjacent locations and boxes that map a value from an precursor location or box to a successor location or box.

Wherein the processor also generates a summary for each substructure capable of being represented as a table wherein each row represents a location, box or the external assumptions of the substructure, and wherein each row comprises three values that respectively represent:

Whether the summary is an assumption for a box, a guarantee for a location or external assumptions.

Whether the current sub-formula is true, false or undetermined at that state when a first external assumption of that substructure is assumed to be false.

And whether the current sub-formula is true, false or undetermined at that state when the other external assumption of that substructure is assumed to be true.

Then, starting with the simplest sub-formula, the processor operates to refine the summaries by:

(i) applying computational tree logic (CTL) model checking to each sub-structure to check whether the each guarantee is true, false or undetermined for each external assumption and updating the corresponding values of the summary accordingly. Then, (ii) checking whether the internal assumptions of each box are consistent with the first internal guarantees of the callee sub-structure, and whether the external assumptions are consistent with the external guarantees of the caller sub-structure and updating the corresponding values of the summary accordingly. Then, (iii) iteratively repeating steps (i) and (ii) until no further refinement of the sub-formula is possible.

Then the processor iteratively repeating steps (i), (ii) and (iii) for each sub-formula in increasing complexity, until no further refining is possible for the most complex sub-formula, and therefore the entire formula.

Advantages of the Invention Include:

The checking is performed locally component by component.

The flexibility to use the same method to check any temporal logic specifications. Examples of other checks include: address memory corruption, memory leaks, security vulnerabilities, API rule violation, unclean code, coding standards violations, as well as any other check that can be coded as a CTL specification.

The ability to use pre-computed summaries for commonly used libraries, Both C and C++ comes with a large number of libraries which provide access to standard procedures, that allow the programmer to use existing solutions in their own code. For commonly used libraries it is possible to pre-compute the summaries used by the invention and store them for later user, rather than computing summaries as part of the overall analysis. The corresponding guarantees in the entry states can be computed for each possible combination of external assumptions introduced by user code. This is in particular efficient for stand-alone libraries that do not contain calls back to the user-code, but are only called from within the user code. In that case the calls to a library function is a so-called cut set in the call-graph, which means that the correctness of all descendants in the call graph depend only on each other, and not on the user code.

The ability to incrementally compute summaries if the source code changes locally, The invention allows for incremental checking when code, and thus the corresponding substructure, changes locally. After a change only the sub-structures that are affected by the change need to be checked. If the new or changed sub-structure behaves the same with respect to the sub-formula, only this sub-structure needs to be checked.

The ability to distribute the checking for strongly connected components of functions and procedures.

The invention lends it self to be performed distributively, since at least part of the process can be performed independently on a different processors. The procedure also gives additional options to be distributed, based on an analysis of the Call graph. The call graph is a directed graph, which can be decomposed into a directed acyclic graph of strongly connected components. Each group of components that are not descendant or predecessor of another can be analysed independently, once their common predecessors have been analysed.

Parameterized Properties

The invention allows for the use of parametric labels. These labels may depend on local variables as well as on parameters that are passed to functions, and these may also be used in the CTL specification. Since the invention model checks by-substructure, parameterized labels can be taken into account in a straightforward way. There is no need to check a function for each possible combination of parameter. It is sufficient to define atomic labels and parameterized labels, and provide a mapping from the parametric to atomic labels. This mapping will then also define the appropriate CTL formula and corresponding summary.

In summary, the invention provides a flexible framework, that analyses the source code model locally, and keeps the structure intact without constructing a single unified model. This in turn allows for to check interdentally and pre-compute partial results.

BRIEF DESCRIPTION OF THE DRAWINGS

An example of the invention will now be described, in the context of an automata based static analysis framework that is implemented in our tool Goanna. In the accompanying drawings:

FIG. 11 is a diagram showing parameterised labels with parameterised CTL formulae.

LIST OF DEFINITIONS

See End of Description

Figure 1:
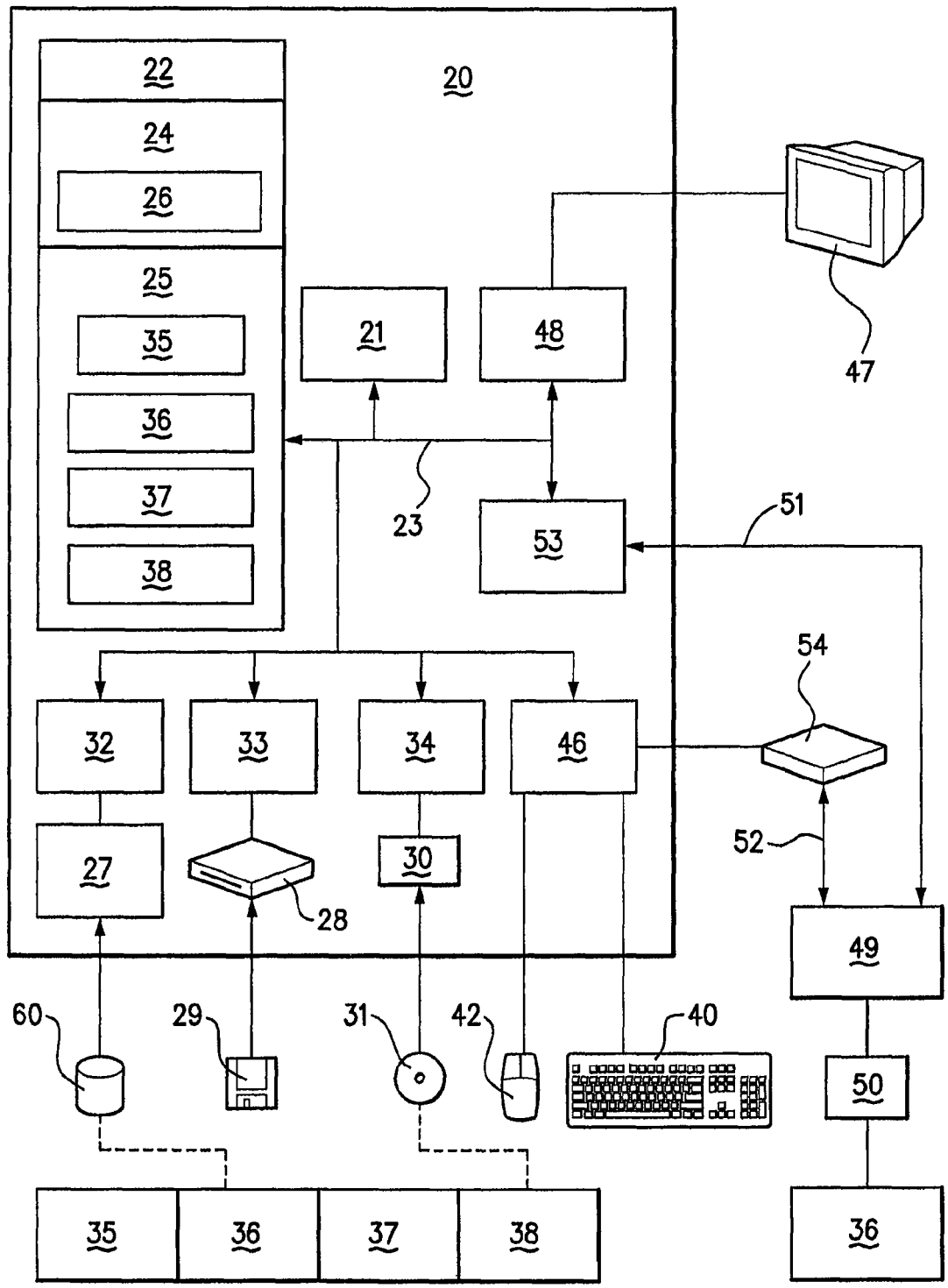
FIG. 1 is a block diagram of a general purpose computer.

Definition of Recursive Kripke Structures
Definition of Ternary Logic
Definition of Computational Tree Logic (CTL) syntax
Definition of Summaries
Definition of Associated Kripke Structure
Definition of Locally Coherent Summary
Jargon In the following discussion it will be useful to remember the following:

Locations have internal guarantees which may have the quality of being coherent. Boxes have internal assumptions which may have the quality of being consistent.

BEST MODES OF THE INVENTION

Goanna is a close source project but the technical details of the approach can be found in reference [3] which is incorporated herein by reference.

Some parts of this detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is described in the foregoing context, it is not meant to be limiting as those of skill in the art will appreciate that various of the acts and operations described may also be implemented in hardware.

It should be borne in mind, however, that all of these and similar terms are to be associated with the appropriate physical quantities and are merely convenient labels applied to these quantities. Unless specifically stated otherwise as apparent from the description, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Turning to FIG. 1, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor system. 1 microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

In FIG. 1 a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment shown employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated. The logical connections depicted include a local area network (LAN) 51 and a wide area network (WAN) 52. Such networking environments are commonplace in offices, enterprise-wide computer networks, intranets and, inter alia, the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
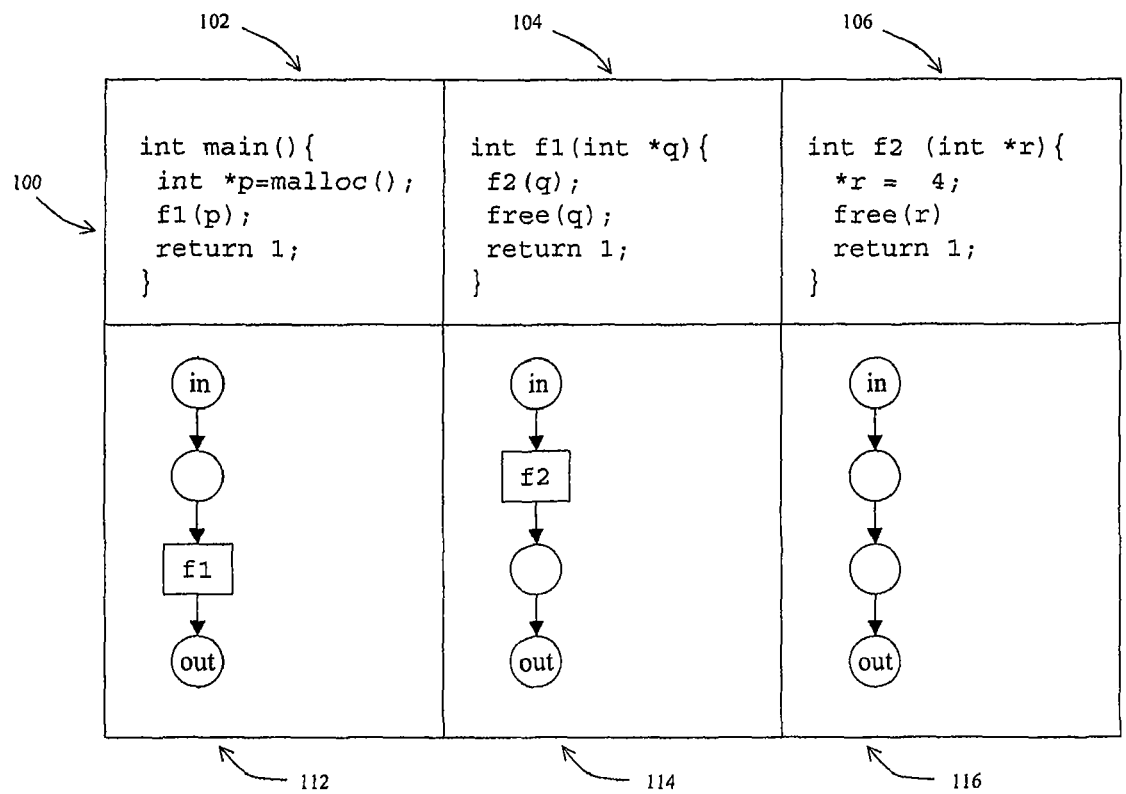
FIG. 2 is a diagram showing three functions of a C-program, and their associated control flow graphs (CFG).

FIG. 2 depicts an example of a C-program 100 that comprises three functions 102, 104 and 106, and the associated call graphs 112, 114 and 116. The locations 120, 122, 124, 140, 142, 144, 160, 162, 164 and 166, in each call graph represent C-statements that are treated locally, while the boxes 130 and 150 model calls other functions.

Figure 3:
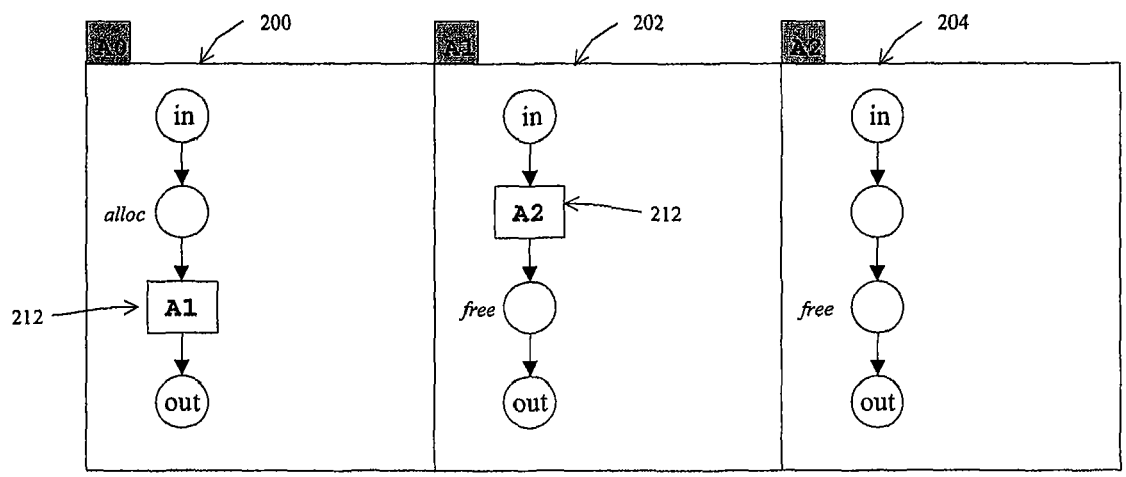
FIG. 3 is a diagram showing the three sub-structures $A_0$, $A_1$ and $A_2$ that make up the Recursive Kripke structure (RKS) associated with the functions and CFGs of FIG. 2.

FIG. 3 is a diagram depicting how a recursive Kripke Structure (RKS) models the call graphs 112, 114 and 116 of FIG. 1. The RKS has three sub-structures A0, A1 A2, 200, 202 and 204 respectively. The boxes 210 and 212 are labelled to identify the callee sub-structures; so in sub-structure A0 200 the box 210 A1 indicates that it is sub-structure 'A1' 202 that is being called.

The arrows pointing down from each location or box, to the next, represent transitions. The transitions are between initial locations or boxes and map a value representing a proposition to a successor location or box.

The atomic propositions in this example are free and alloc, marking locations which are freed or allocated. Propositions may also be parametric (depend upon the value of a parameter p), for instance free (p).

An example of a check for this program would be that memory is never freed twice, unless it is allocated in-between.

For the example in FIGS. 2 and 3, we want check that memory is never freed twice, unless it is allocated in-between. In CTL, using all common operators, this property can be expressed as the equation:

$$AG \text{ free implies not } (EX\,E \text{ not alloc } U \text{ free}) \tag{1}$$

This formula means that it always the case (AG), that if memory if freed it should not be followed by a path that frees it and does not allocated it before. This formula can be reduced to an equivalent formula that uses only the operators defined in the Definition of CTL Syntax:

$$\text{not } E \text{ true } U \text{ not(not free or not}(EX(E \text{ not alloc } U \text{ free}))) \tag{2}$$

Note that true is satisfied by default in all locations.

The invention is essentially a labeling algorithm that checks such a CTL formula by structural induction over its sub-formulae. This means that for a temporal formula PHI of the form:

$$EG\,phi, E\,phi\,U\,psi, \text{ and } EX\,phi$$

we can assume that the locations in the RKS that satisfy phi and/or psi are labeled with phi and/or psi respectively. After each iteration of the structural induction the labeling algorithm will label the locations in the RKS with EG phi, E phi U psi, and EX phi, if they satisfy the respective formula.

TABLE 1

| phi0 | — | true |
|------|---|------|
| phi1 | — | free |
| phi2 | — | alloc |
| phi3 | not phi1 | not free |
| phi4 | not phi2 | not alloc |
| phi5 | E phi4 U phi1 | E not alloc U free |
| phi6 | EX phi5 | EX E not alloc U free |
| phi7 | not phi6 | not (EX E not alloc U free) |
| phi8 | phi2 or phi7 | not free or not (EX E not alloc U free) |
| phi9 | not phi9 | not (not free or not (EX E not alloc U free)) |
| phi10 | E phi0 U phi9 | E true U not (not free or not (EX E not alloc U free)) |
| phi11 | not phi10 | not E true U not (not free or not (EX E not alloc U free)) |

Table 1 shows the Sub-formulae of CTL formula (2)

The algorithm begins by checking first the simplest formulae, like free, and then uses the result to check other more complex formulae like not free.

Figure 4:
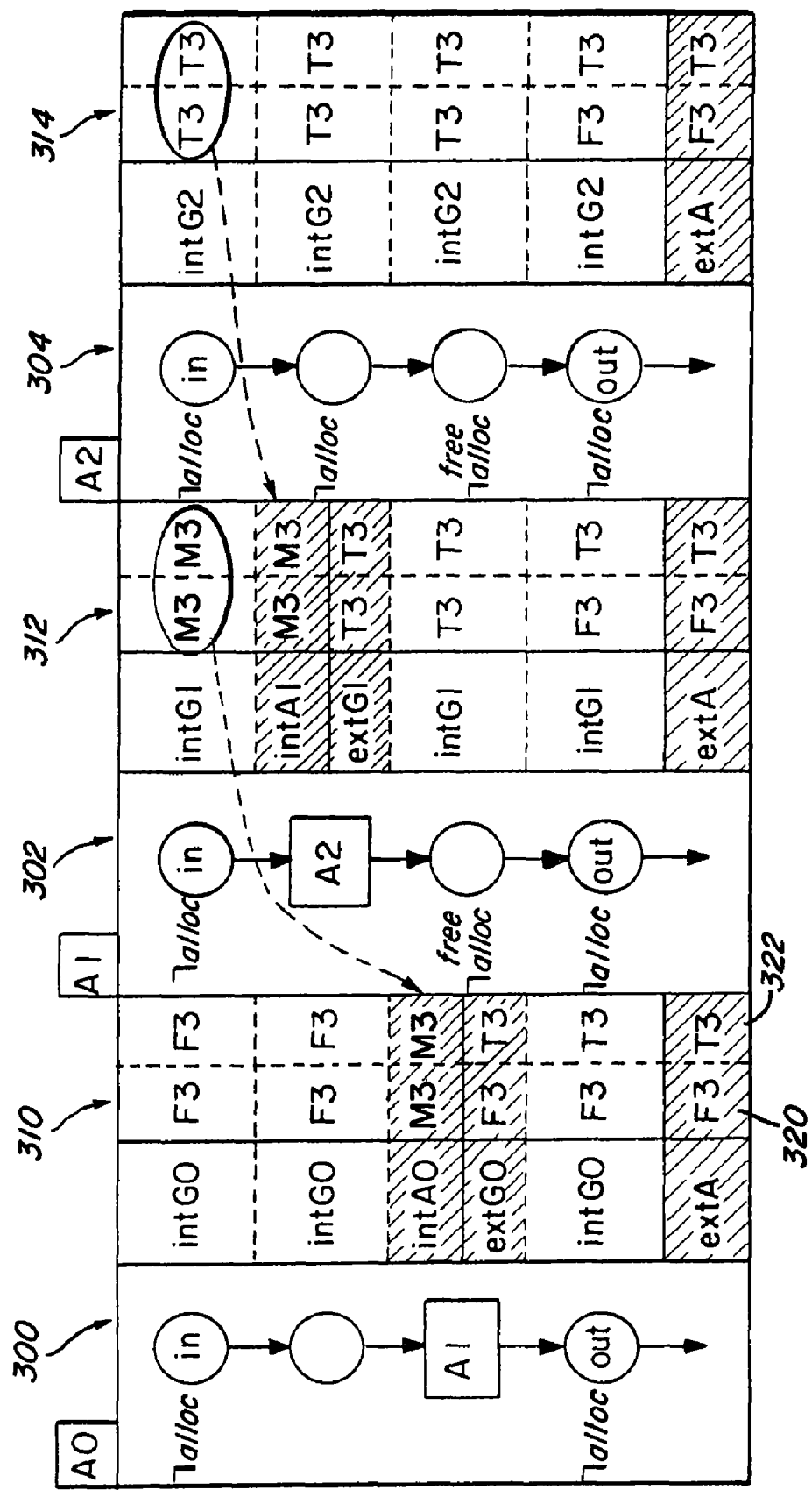
FIG. 4 is a diagram showing the sub-structures of FIG. 3 together with respective tables marked with summaries for the Computational Tree Logic (CTL) formula (3). The summaries for the assumptions are on grey background, whereas those for the guarantees relating to the locations are not shaded.

We now provide a worked example. For simplicity of explanation we consider only sub-formula $$E \text{ not alloc } U \text{ free} \qquad (3)$$

applied to the substructures of FIG. 4 and assume that it has already been calculated which states in the substructure satisfy not alloc and free. FIG. 4 depicts how the RKS models the call graphs, and which locations in the model satisfy the sub-formula not alloc and free.

To the right of each sub-structure 300, 302 and 304 a summary is depicted as a table 310, 312 and 314.

The first column of the table has a variable that indicates whether the summary is an assumption (these summaries are shaded), or a guarantee (which are not shaded).

Internal assumptions are associated with boxes in the substructures. For instance box A1 is associated with internal assumption 'intA0' in sub-structure A0, which is a shaded row in summary 310 to the right of the box. For the temporal formulae PHI of the form EX phi The assumption intA0 specifies whether PHI is assumed to true in the first location of a box.

There are also external assumptions shaded and labelled, for example, 'extA' at the bottom of the table. These assumptions are at the bottom of the table since they are assumptions about the successor state of the exit location 'out'. The external assumption can only take the values T3 and F3. In the event the external assumption is M3, then he combined value of the two columns is used.

Internal guarantees are associated with locations and are labelled, for example, 'intG0' (internal guarantee '0'). These are not shaded.

Boxes also have external guarantees.

Locations also have external assumptions.

For the temporal formulae PHI of the form EX phi the guarantee intG0 specifies whether PHI holds in a location.

For the other types of temporal formulae, for instance phi and E phi U psi, the guarantee and the assumption are both about the validity of PHI; whether it is guaranteed to hold in a location, or assumed to be true in a box. For example, suppose guarantee intGi maps an initial value T3 to a successor value T3. This means that if we assume that phi is true in a successor of OUTi then it is guaranteed that phi is true in INi The value M3 is used to represent that either a substructure has not been evaluated yet for a given assumption, or that the result is inconclusive. The latter can happen if the result depends on other inconclusive or unevaluated summaries. The assumptions and guarantees given external assumption M3 are the combined assumptions and guarantees for T3 and F3. This combination is defined by the join-operator.

The second column is populated with current values for the guarantees and assumptions (we explain how the process is initiated below) when the external assumption is false, indicated by F3 at 320.

The third column is populated with current values for the guarantees and assumptions (we explain how the process is initiated below) when the external assumption is true, indicated by T3 at 322.

It follows that the external assumptions in the bottom row of the table are always labelled F3 and T3.

Processing Steps

Figure 5:
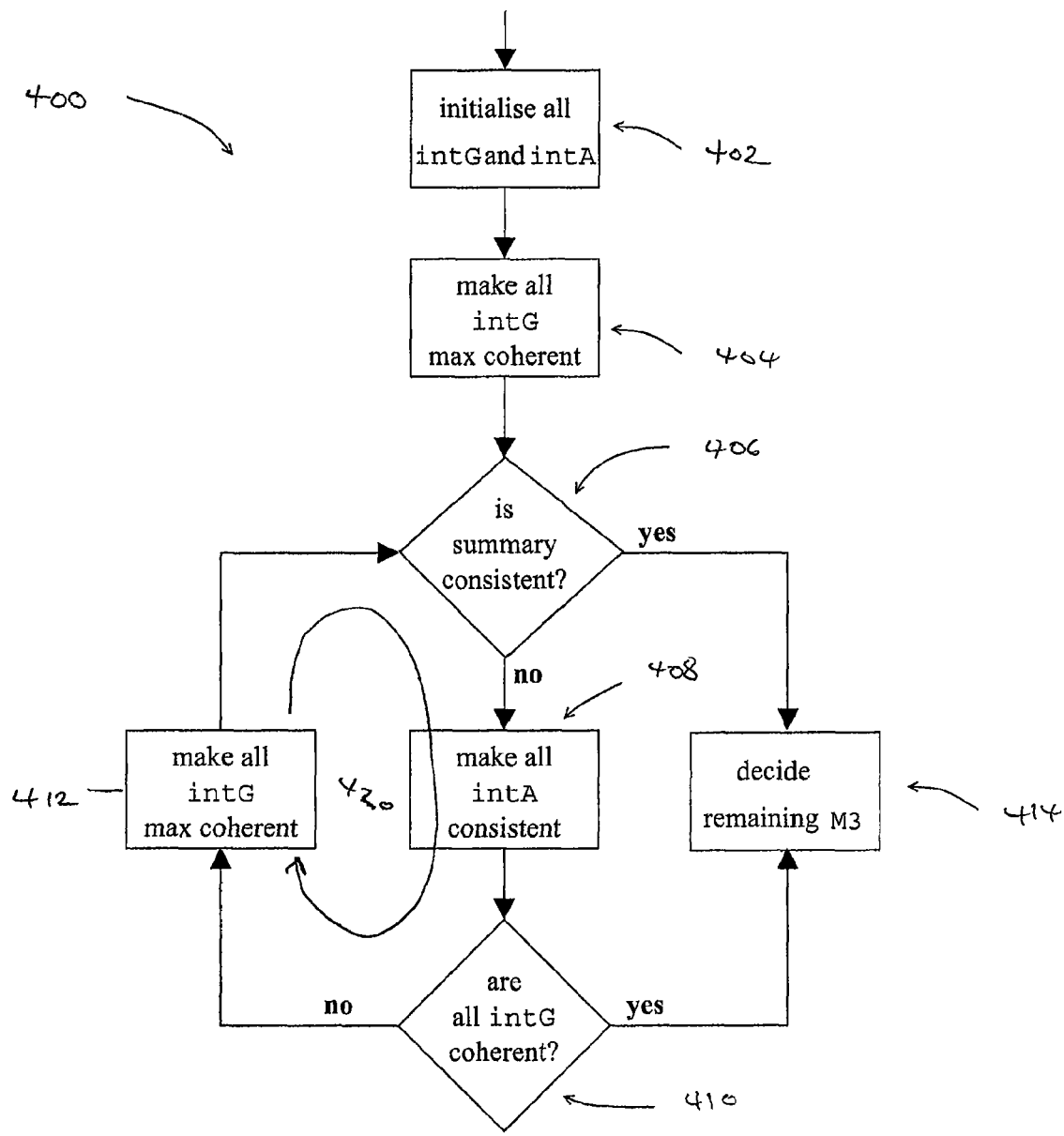
FIG. 5 is a flowchart of the operational process used to check a sub-formula.

Referring now to FIG. 5, a process 400 is applied to evolve the values of the summaries to a final form from which it is possible to identify errors in the code that frees a path that has not been allocated. Reference to the Definitions at the end of the description will provide mathematically rigorous definitions underlying the explanations.

The process does not construct the underlying and potentially infinite Kripke structure of the RKS, but checks the validity of a formula using a combination of summaries in the substructures. More particularly the process checks each substructure for a given computational tree logic (CTL) formula such as PHI, using an associated Kripke structure (RKS) for a given sub-structure and summary, and an assumption about the validity of PHI at the exit location of the substructure. As a result the process populates the summaries in the substructure with the values M3, T3 or F3.

Step 1—Initialize Values for all the Summaries (Assumptions and Guarantees) 402

All guarantees and assumptions are initialized to the conservative value 'M3'. This indicates that the values are undetermined. During processing the values will be resolved to being true 'T3' or false 'F3'

Step 2—Make the Values of the Guarantees at all Locations Maximally Coherent 404

Standard model checking is employed to generate maximally coherent guarantees at all the locations: The guarantees at the locations are labelled T3 if and only if the equation:

$$E \text{ not alloc } U \text{ free}$$

is true or if there exists a path, through one or more transitions, that satisfies not alloc until an assumption T3.

And locations are labelled F3 if and only if equation:

$$E \text{ not alloc } U \text{ free}$$

is false and there is no path that satisfies not alloc until an assumption T3 or M3.

In practice this means that when external extA of substructure A0 is assumed to be false F3, then the last row of the first column of intG0 are labelled F3 because:
  i. It does not satisfy E not alloc U free, and
  ii. There exists no path to an assumption T3 or M3.

The extG0 value of the box labelled A1 is labelled F3 since its only successor is F3 because:
  i. They do not satisfy E not alloc U free, and
  ii. The path to assumption M3 does not satisfy "not alloc" in every intermediate position.

On the other hand when external assumption extA is true T3, then the second and third columns of intG0 above assumption intA0 are labelled F3 because:
  i. They do not satisfy E not alloc U free, and
  ii. The path to assumption M3 does not satisfy "not alloc" in every intermediate location.

However, the final intG0 in the third column is labelled T3 because the transition path from it down the third column encounters extA with the value T3, and the path satisfies "not alloc" in every intermediate location.

The summaries of the Guarantees shown at the locations in FIG. 3 are in fact maximally coherent for CTL formula E not alloc U free.

It should be noted that local coherence puts no restrictions on the labelling of boxes.

Loop Step 1—Check the Values of all Assumptions are Consistent 406

After the guarantees at the locations are settled as being coherent, the next step is to determine whether the Assumptions are consistent.

If all the assumptions are consistent then go to step 414.

If not then go to step 408.

Loop Step 2—Make the Value of all Assumptions Consistent 408

Figure 6:
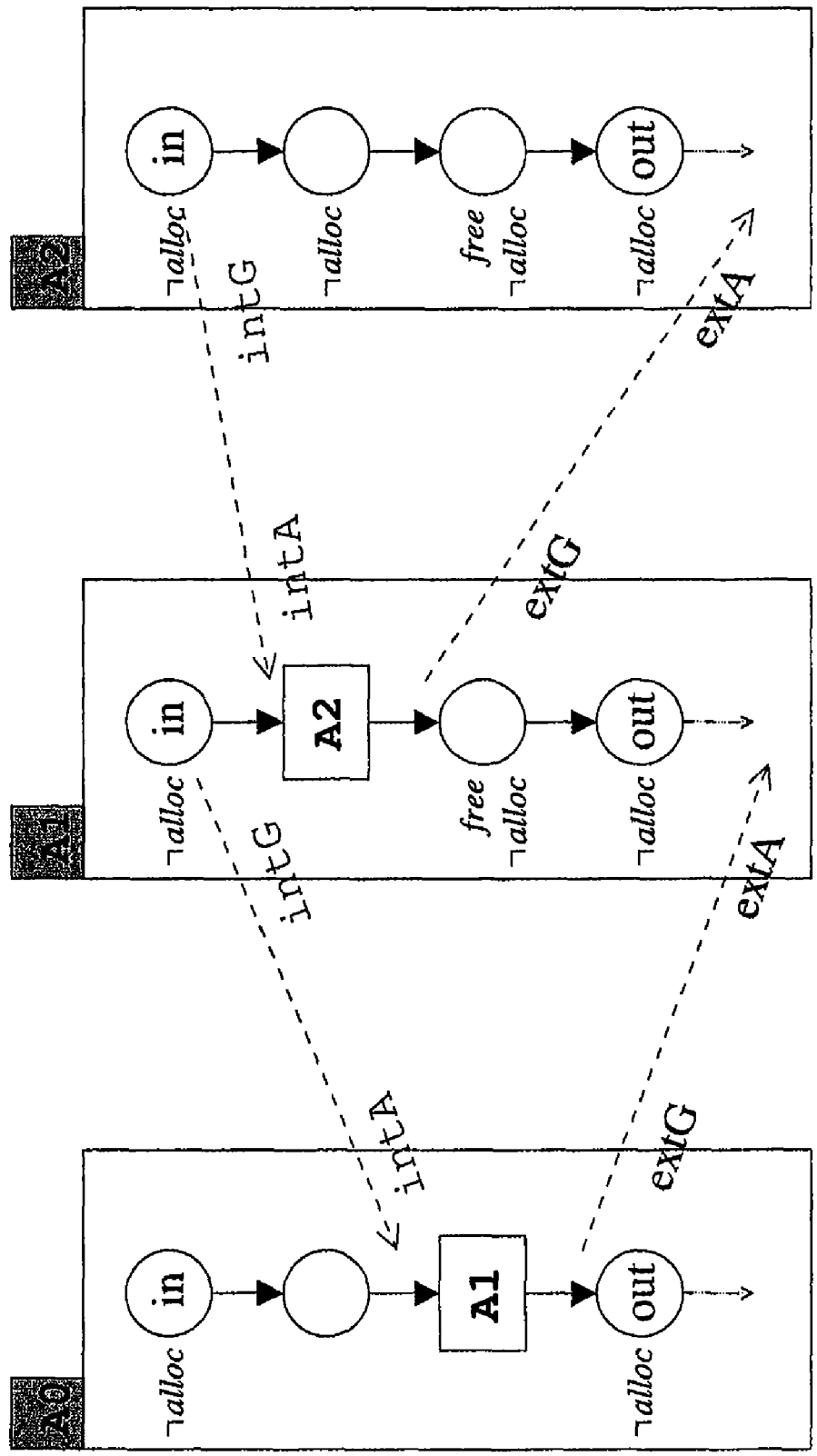
FIG. 6 is a diagram showing how the guarantees are used to update the assumptions and make them consistent.

The general flow of processing is shown in FIG. 6. In this figure sub-structure A2 is the callee of sub-structure A1, and A1 is the callee of A0. Conversely, A0 is the caller of A1, and A1 is the caller of A2.

Here it can be seen that the internal guarantees (intG) from the first location of each callee substructure are used to update the internal assumptions (intA) of the caller substructure.

In our FIG. 4 example, it can be seen that the state of the internal assumption intA0 in box A1 has previously been retrieved from the internal guarantee intG1 of the callee substructure A1, making the assumption intA0 consistent. Also, the state of the internal assumption intA1 in box A2 has been retrieved from the initial guarantee intG2 of the callee substructure A2. These updates are indicated by the balloons and arrows in FIG. 4.

Loop Step 3—Check if all Internal Guarantees are Coherent 408

The next step checks again to see which substructures are incoherent. It is only necessary to check those sub-structures where a guarantee has changed in step 406, or that use such sub-structures.

If all the internal guarantees are coherent then go to Step 414.

If not then go to Step 404/412.

Loop Step 4—Make all Internal Guarantees Maximally Coherent 412

See Step 404.

Looping 420

From this point on the procedure iterates around the loop 406, 408, 410 and 412, checking for consistency, making the summary consistent if this is not the case, then checking for maximal coherence, and computing the maximal coherent guarantees if that is not the case. The procedure terminates when the summary is maximally coherent and consistent.

Final Step—Decide remaining M3 414

When the processing loop 406, 408, 410, 412 is exhausted; that is when it is maximally coherent and consistent, then all the remaining unspecified values in the summaries are examined.

At the end of the iterative process, if the formula has the form EX phi, it is guaranteed that the summary will not contain any M3 when it is maximally coherent and consistent.

This is different for CTL formula of the form EG phi, or E phi U psi; in those cases the summary may still contain assignments to M3.

However, if the formula is of the form EG phi it is the case that all locations with guarantee M3 do satisfy EG phi. It can be shown that there must exist a loop in the RKS such that all locations along the path satisfy phi.

Similarly, if the formula is of the form E phi U psi, it is the case that all locations with guarantee M3 do not satisfy E phi U psi, provided the summary is consistent and maximally coherent. It can be shown that if there would exist a location that satisfies E phi U psi, then that location should have been labelled with guarantee T3 rather than M3.

Therefore:

If PHI=EG phi, then change all $M_3$ in guarantees to T3.

If PHI=E phi U psi, then change them to F3.

Note, that strictly speaking only one of the two termination checks is necessary. It suffices to check whether the summaries are consistent after they have been made maximally coherent, or alternatively, to check whether they are maximally coherent, after they have been made consistent.

Note also that the frameworks allows for smaller incremental steps. The procedure could make the summary consistent, as soon as any update of a guarantee makes the summary inconsistent, rather than making all guarantees maximally consistent as batch, or before the summary is made consistent as a batch.

For a formula PHI and an RKS A, we refer to the procedure that computes the final summary $Sigma^{phi}$ as subcheck (A, phi).

From this it can be inferred for which states formula PHI is true, and for which states false.

Nested Formulae

Up to now we have described the process for checking a simple CTL formula (memory is never freed twice, unless it is allocated in-between). Now we will extent the process for checking nested CTL formulae.

A key in checking these is to maintain for each sub-formula phi and for each sub-structure Ai a set of labeling functions LABELSETi-for-phi and REFSETi-for-phi, rather than one pair of labeling functions for each sub-structure. To use a set rather than a single pair it becomes necessary, to record which sub-structure has been called with which assumption.

The Labeling function LABEL[i,j] from LABELSETi-for-phi labels all locations with {phi} if they satisfy phi and otherwise with the empty set.

The corresponding labeling function REF[i,j] from REFSETi-for-phi points for all boxes to LABEL[i,j] from LABELSETi-for-phi that is consistent with the local assumptions and guarantees.

Given an RKS A=(A0, . . . , An) and a labeling Σ-for-phi we can create an new RKS with sub-structures A[i,j] over atomic propositions {{phi}, { }}, by substituting LABELi and REFi in Ai with LABEL[i,j] from LABELSETi-for-phi and REF[i,j] from REFSETi-for-phi. We refer to this operation as rks(A, Σ-for-phi).

Given a sub-formula labeling Σ-for-phi and Σ-for-psi for sub-formulae phi and psi the necessary operations amount to operations on the sub-formula labeling. There are two important operators on sub-formula, one that introduces new labeling, given a summary S-of-PHI, and one that merges the labeling for sub-formulae Σ-for-phi and Σ-for-psi. The latter is necessary as a precursor for the binary CTL operators or and EU.

Split

Given an RKS A=(A0, . . . , An), and summary S-of-phi=subcheck(A,phi), and an external assumption extA0. We introduce for t=F3 and guarantee intGi a new labeling LABELi-0. It maps a location loc to {phi} if intGi(F3,loc)=T3 and to { } otherwise. Similarly, we introduce for t=F3 and guarantee intGi a new labeling LABELi-1, which maps loc to {phi} if intGi(T3,loc)=T3 and to { } otherwise.

Assume a box points to a substructure with index j=REFi (box) and external assumption extA=F3. If extG(F3,box)=

F3, then REF[i,0] will map box to the index [j,0], and if extG(F3,box)=T3 then REF[i,0] will map box to the index [j,1]. Similarly, if extA=T3, REF[i,1] will map [j,0] if extG (F3,box)=F3, and to (j,1) if extG(F3,box)=T3. There is a marked initial labeling LABEL[0,0], which is derived from intG0(ext0). Recall that all M3 have been removed from S-of-phi. At the end of the procedure all new sub-structures that are not in the call graph from the initial sub-structure A0 with the initial labeling LABEL[0,0] can be removed from the list Σ-for-phi.

We denote this procedure with Σ-for-phi=split(A,S-of-phi, ext0)

Figure 7:
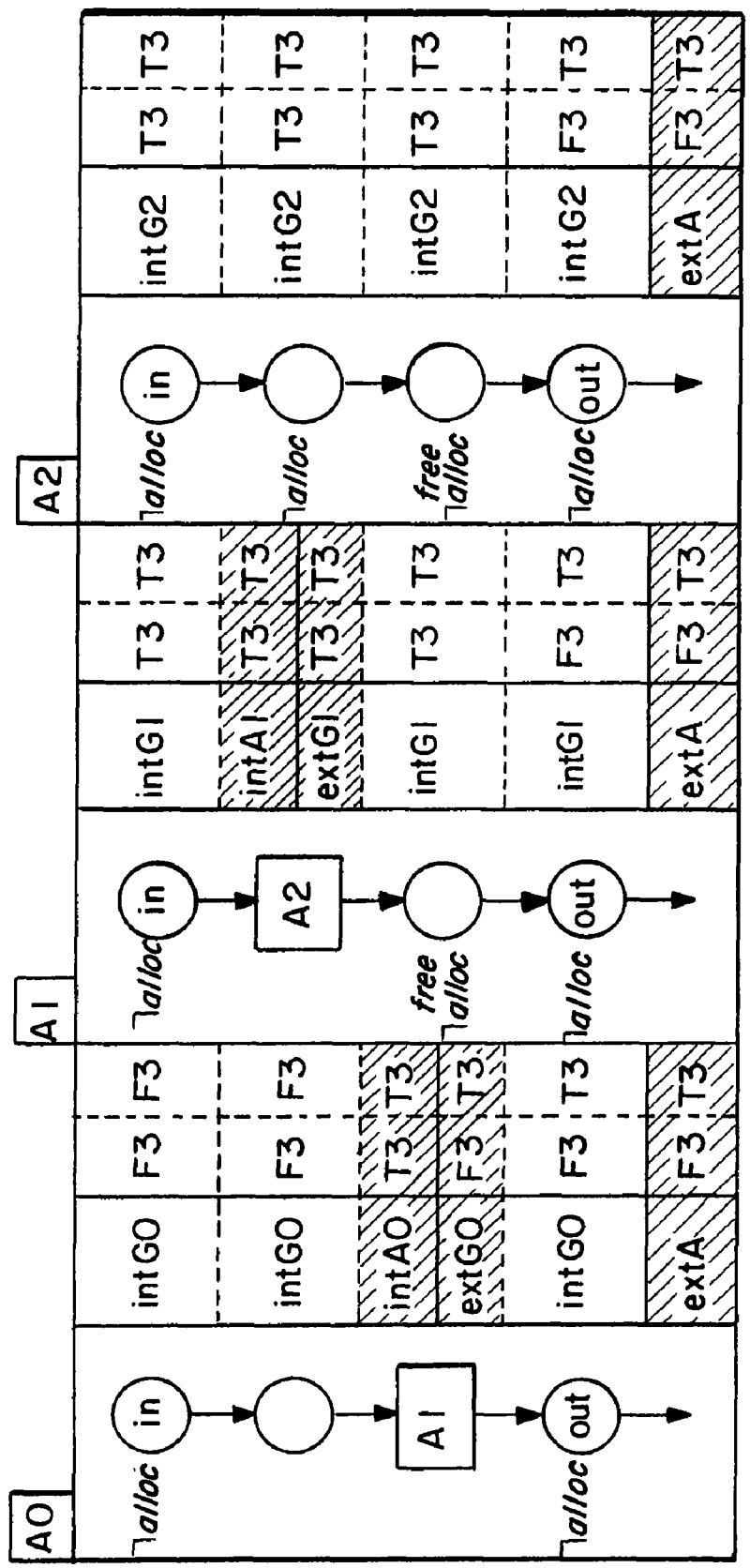
FIG. 7 is a diagram showing the RKS with all summaries maximally coherent and consistent for a given CTL formula.
Figure 8:
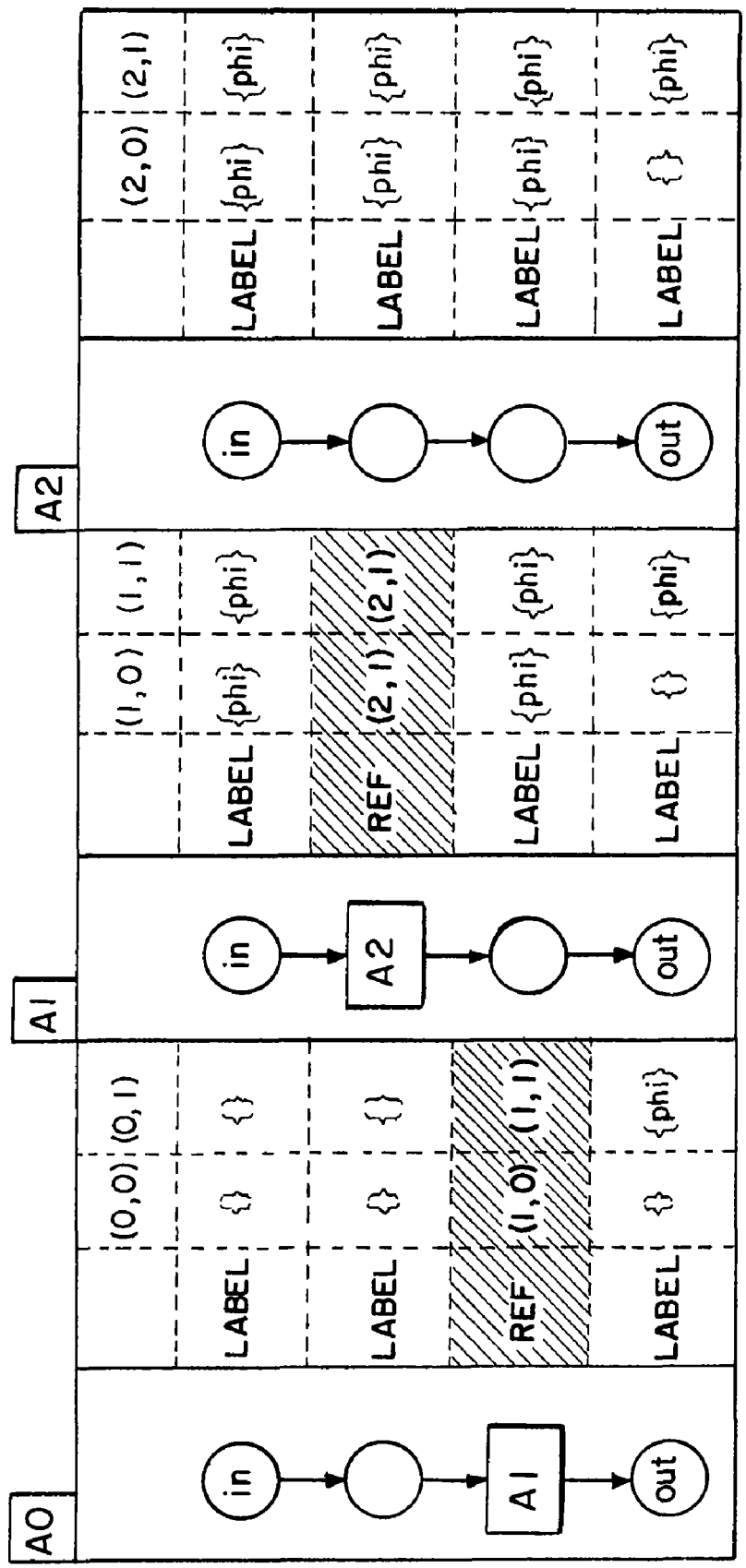
FIG. 8 is a diagram showing sub-formula labelling, derived from the summary in FIG. 7 after a split.

FIG. 8 shows the labeling derived from the maximally coherent and consistent summary in FIG. 7 for phi=E not alloc U free. It shows the new labeling functions LABEL[i,j] and REF[i,j]. The initial sub-structure after the split has labeling functions LABEL[0,0] and REF[0,0]. From this sub-structure only sub-structures with labeling LABEL[1,0], REF[1,0] and LABELi[2,1], REF[2,1] are reachable. The others can be safely omitted.

Merge

For the CTL formulae of the form E phi U psi and phi or psi it is necessary to merge the sub-formula labeling Σ-for-phi and Σ-for-psi. We denote the resulting sub-formula labeling as Σ-for-phi-psi. For each sub-structure Ai, we compute all possible unions of LABEL[i,j] from LABELSETi-for-phi with LABEL' [i,j'] from LABELSETi-for-psi, this means the new labeling function assigns to each loc the union LABEL [if](loc) U LABEEM(loc).

The labeling functions in REFSETi-for-phi and REFSETi-for-phi are combined accordingly. Given REF[i,j] from REF-SETi-for-phi and REF' [i,j'] from REFSETi-for-psi. Suppose that REF[i,j](box)=[k,l] and REF' [i,j'](box)=[k,l] then the labeling function will point to LABEL[k,l] U LABEL'[k,l']. The new initial labeling uses the union of the initial labeling of Σ-for-phi and Σ-for-psi. At the end of the procedure all new sub-structures that are not in the call graph from the initial sub-structure can be removed from the list Σ-for-phi-psi.

We denote this procedure that merges two sub-formula labeling with Σ-for-phi-psi=merge(Σ-for-phi,Σ-for-psi).

Figure 9:
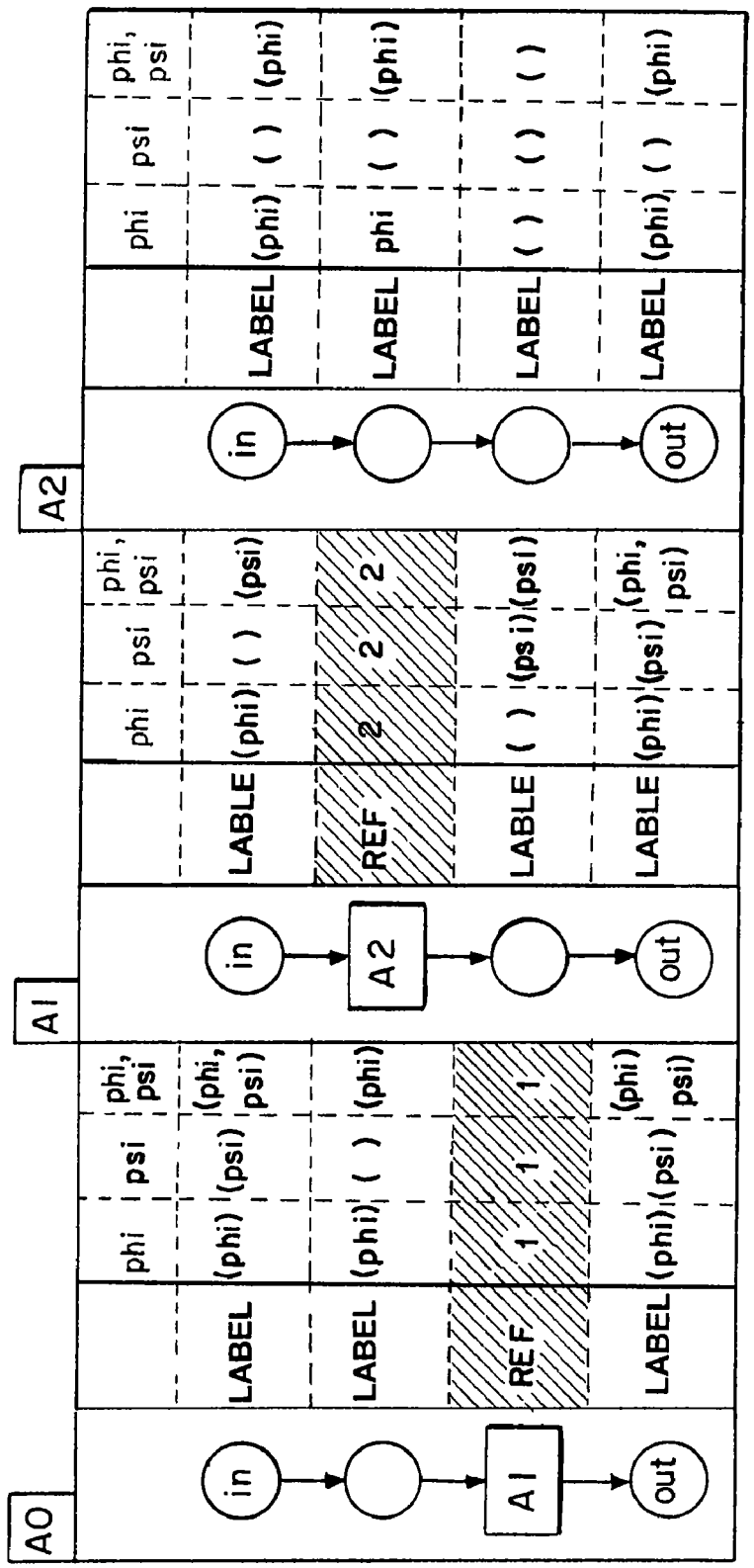
FIG. 9 is a diagram illustrating the merging of sub-formula labelling for phi=not (EX E not alloc U free) and psi=not free. This is used to compute the labelling for phi or psi.

FIG. 9 depicts how the labeling for phi=not (EX E not alloc U free) and psi=not free will be merged. The resulting labeling of Σ-for-phi-psi can then be used to compute the labeling for phi or psi. A location loc will be labeled phi or psi if it is either labeled phi or psi.

TABLE 2

Case PHI=p
   Σ-for-PHI with
     LABELSETi-for-PHI ={LABEL[i,0]} and
     REFSETi-for-PHI ={REF[i,0]}
and
     LABEL[i,0](loc)={p} if PHI ∈ LABELi(loc),
     LABEL[i,0](loc)={ } otherwise.
     REF[i,0](box)=REFi(box)
     extA-for-PHI=F3
Case PHI=not phi
   Given Σ-for-phi with
     LABELSET0-for-phi ={LABEL[i,0], ..., LABEL[i,k]} and
     REFSET0-for-phi ={REF[i,0],...,REF[i,k]}
   and extA-of-phi. Then
   Σ-for-PHI with
     LABELSET0-for-PHI ={LABEL'[i,0], ..., LABEL'[i,k]} and
     REFSET0-for-PHI ={REF'[i,0],...,REF'[i,k]}
   and
     LABEL'[i,j](loc)={not phi} if phi ∉ LABEL[i,j](loc),
     LABEL'[i,j](loc)={ } otherwise.
     REF'[i,j]=REF[i,j]
     extA-of-PHI=not extA-of-PHI Table 2: the Steps Used to Check a CTL Formula of the Form p or not phi by Structural Induction Over the Sub-Formula Induction Over Sub-Formulae Given methods to check sub-formulae, merge and split labeling with sub-formulae, and a procedure to map the sub-formula back to RKS, we can now define the procedure to check nested CTL formulae. We will perform this by checking the sub-formulae bottom up from the atomic propositions to the complete formula. Recall that a CTL formula is defined by the following grammar $$PHI = p\mid\text{not } phi\mid phi \text{ or } phi\mid EX\, phi\mid EX\, phi\mid E\, phi\, U\, psi \qquad (6)$$

where p from AP.

TABLE 3

Case PHI=phi or psi
   Given Σ-for-phi, Σ-for-psi extA-of-phi and extA-of-psi.
Then
   Σ-for-phi-psi =merge(Σ-for-phi, Σ-for-psi)
   Let Σ-for-phi-psi with
     LABELSET0-for-phi-psi ={LABEL[i,0], ..., LABEL[i,k]} and
     REFSET0-for-phi-psi ={REF[i,0],...,REF[i,k]}
Then
   Σ-for-PHI with
     LABELSET0-for-PHI ={LABEL'[i,0], ..., LABEL'[i,k]} and
     REFSET0-for-PHI={REF'[i,0],...,REF'[i,k]}
and
     LABEL'[i,j](loc)={phi or psi}
if phi∈LABEL[i,j](loc) or psi∈LABEL[i,j](loc),
     LABEL'[i,j](loc)={ } otherwise.
     REF'[i,j]=REF[i,j]
     extA-for-PHI=extA-for-phi or extA-for-psi
Case PHI = EX phi or PHI= EG phi
   Given Σ-for-phi, A-for-phi and extA-of-phi. Then
     A-for-phi=rks(A, Σ-for-phi)
     S-for-PHI=subcheck(A-for-phi,PHI)
     Σ-for-PHI = split(A,S-for-PHI,extA-for-phi)
     extA-for-PHI=extA-for-phi
Case PHI= E phi U psi
   Given Σ-for-phi, Σ-for-psi extA-of-phi and extA-of-psi.
Then
     Σ-for-phi-psi =merge(Σ-for-phi, Σ-for-psi)
     A-for-phi-psi=rks(Ai, Σ-for-phi-psi)
     S-for-PHI=subcheck(A-for-phi-psi,PHI)
     Σ-for-PHI = split(A, Σ-for-PHI, extA-for-psi)
     extA-for-PHI=extA-for-psi Table 3: the Steps Used to Check a CTL Formula of the Form phi or psi, EX phi, EG phi or E phi U psi by Structural Induction Over the Sub-Formula.

Given an RKS A=(A0, . . . , An), and an initial external assumption extA=F3 for A0. For a sub-formula PHI we first compute Σ-for-PHI by model checking A-for-phi (or A-for-phi-psi), and then a new external assumption extA-for-PHI. Tables 2 and 3 show which operations are involved in each of these steps. For atomic propositions p∈AP the sub-formula labeling will simply use the original labeling. Since it assumed that the initial sub-structure A0 is continuing in an unlabelled state forever, the external assumption is in this case F3. The labeling for other proportional logic operator not and or is conducted similarly, except that for the binary operator or two sub-formula labelings need to be merged first.

For the temporal operators EX, EG, and EU, the procedure described with reference to FIG. 5 is used. Once the summaries are computed we split the labeling accordingly. In case of the binary operator EU the sub-formula labeling needs to be merged first and the corresponding RKS computed. The RKS A satisfies a CTL formula PHI if for the initial state IN[0,0] of A[0,0] holds PHI∈LABEL[0,0](IN[0,0]).

FIG. 9 depicts the labeling used to compute not free or not (EX E not alloc U free). The states that will be labeled not (not free or not (EX E not alloc U free)), are the locations that have been labeled with the empty set in FIG. 9.

Figure 10:
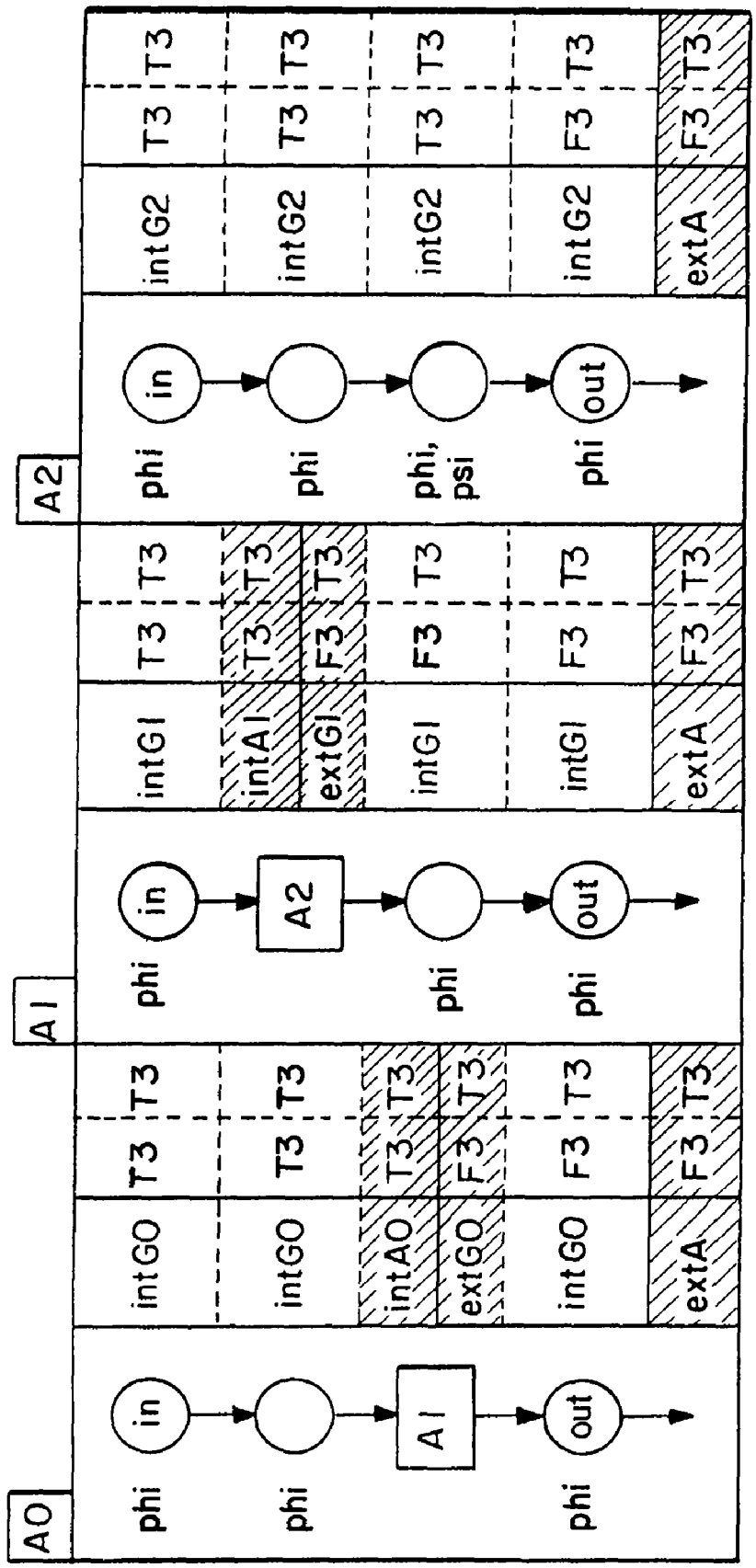
FIG. 10 is a diagram illustrating the RKS A-for-phi-psi for phi=true and psi=not (not free or not
(EX E not alloc U free)). The depicted summary is maximally coherent and consistent.

In FIG. 10 this labeling is applied to the RKS, with phi=true and formula psi=not (not free or not (EX E not alloc U free)). The depicted summary in FIG. 10 is for the sub-formula E phi U psi=E true U not(not free or not (EX E not alloc U free)). It is maximally coherent and consistent.

Given that the external assumption on A0 is extA-for-psi=F3, we can conclude from the above that the RKS satisfies E phi U psi. This, because in the initial location IN0 guarantee intG0(F3,IN0) is T3. This also means that the CTL formula (2) is not satisfied. There exists a path in which p is freed, and then freed again without being allocated in-between.

The iterative procedure described earlier assumed that the labels on locations were atomic; this means they were taken from a common alphabet. However, the analysis that Goanna performs allows for parametric labels. These labels may depend on local variables as well as on parameter that are passed to functions. Rather than atomic labels such as free, labels may be of the form free(p), and these may also be used in the CTL specification, as depicted in FIG. 11. Since the procedure model checks by-substructure parameterized labels can be taken into account in a straightforward way, which means that the summary will be parameterized as well. There is no need to check a function for each possible combination of parameter. It is sufficient to define atomic labels and parameterized labels, and provide a mapping from the parametric to atomic labels. This mapping will then also define the appropriate CTL formula and corresponding summary.

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

For instance the examples provided above have been restricted to sub-structures with a single entry or exit. However, the approach can be extended to sub-structures with multiple entries and exists.

Similarly, the examples assume, for the sake of simplicity, that there exists no transition between boxes and boxes.

Definitions

Definition of Recursive Kripke Structures

A Recursive Kripke Structure over a set of atomic propositions AP is a tuple of sub-structures (A0, ..., An). Each sub-structure Ai is a tuple (LOCSi, INi, OUTi, BOXESi, TRANSi, LABELi, REFi) with a set of locations LOCSi,
an entry location INi,
an exit location OUTi,
a set of boxes BOXESi,
a set of transitions TRANSi between locations and locations, locations and boxes, and boxes and locations. It is assumed that there exists an outgoing transition for all locations and boxes, except for the exit location which has no outgoing transition,
a labeling function LABELi that maps every location in LOCSi to a subset of AP,
and finally a mapping REFi from boxes BOXESi to the index set $\{0, \ldots, n\}$. The semantics of a RKS is given by runs on an associated Kripke structure, using the following assumptions:

A state of the associated Kripke structure is a tuple (box0, ..., boxk−1,loc) of boxes boxi, followed by a location loc. The set of labels of a state is LABELk(loc). The state represents the call stack, and loc the current control location.

The initial state is the initial state of sub-structure A0

A transition from a location loc to a box box in a sub-structure Ai represents a transition from that location to the entry location of the sub-structure with index REFi (box) associated with box.

Similarly, a transition from a box to a location is equivalent to a transition from the exit location of the associated sub-structure to the location.

The exit state OUT0 of the initial sub-structure A0 has a transition to a special state without label, that has a only transition to it self.

The last assumption reflects that we assume that once the program completed it remains a state where is can stutter forever. This assumption guarantees that the underlying transition is total on the set of states, a technical requirement for Kripke Structures.

Definition of Ternary Logic

We define the set TERNARY=$\{T3, M3, F3\}$. For a,b from TERNARY we define the infix operator or as follows: a or b=T3 is a or b is T3, a or b=F3 if a and b are F3 and a or b=M3 otherwise. For a from TERNARY we define the unary operator not as follows: if a is F3, then not a=T3, if a is T3 then not a=F3, and otherwise not a=M3.

As in Boolean logic we define a and b as not(not a or not b) and a implies b as not a or b. In addition we define the binary infix operator join as follows: if a and b are T3, then a join b=T3, if a and b are F3, then a join b=F3, and otherwise a join b=M3. The operators not, or, and, and implies extend the same meaning of the corresponding operator from Boolean to ternary logic. Any Boolean formula can hence be interpreted over the three values, and the result will be the same for Boolean arguments. The operator join has no equivalent in Boolean logic. The result matches the value of the arguments if they are equal, and will be M3 otherwise. In the remainder we will treat the set of Boolean number BOOL as a restriction of the set of ternary numbers TERNARY. Conversely, if we use to 3 to denote the function that maps Boolean true to ternary T3 and the Boolean false to F3.

Definition of Computational Tree Logic (CTL) Syntax

Given a set of atomic propositions AP, computation tree logic (CTL) formulae are recursively defined as follows:

$$phi = p \mid not\ phi \mid phi\ or\ phi \mid EX\ phi \mid EG\ phi \mid E\ phi\ U\ psi \quad (1)$$

where p is an element of AP.

Note that this is the minimal set of operators for CTL. Other operators such as EF, AF, AG and AU can be derived. We equip CTL with the usual semantic for Kripke structures. Atomic proposition p from AP is true in a state s, if p is a label on s, i.e. p is in set LABEL(s). The propositional logic operators such not and or are used with their usual meaning. The CTL formula EX phi is true in a state s if there exists a successor that satisfies phi. Formula EG phi is true in s there exists a path that starts in s and satisfies phi in every state along the path. And finally, formula E phi U psi is true in a state s0 if there exists a path to some state sn that satisfies psi, while every state between s0 and sn satisfies phi. This can be paraphrased as phi holds until psi holds.

Definition of Summaries

Given a sub-structure Ai=(LOCSi, INi, OUTi, BOXESi, TRANSi, LABELi, REFi) we define its summary si as a pair of (1) an internal assumption function intAi that maps a pair (extA,box) to TERNARY, with extA from TERNARY and box from BOXESi, and (2) a guarantee function intG which maps a pair (extA,loc) to TERNARY, with extA from TERNARY and loc from LOCSi. The assumption function intAi satisfies intAi(M3,box)=intA(T3,box) join intAi(F3,box) for all box from BOXESi. The guarantee function intGi satisfies similarly intGi(M3,loc)=intGi(T3,loc) join intGi(F3,loc) for all loc from LOCSi. We define the summary S of RKS (A0, . . . , An) as the tuple (s0, . . . , sn)

An assumption function intAi for a sub-structure Ai encodes which assumptions are made about the boxes in Ai. We distinguish these assumptions form the external assumption extA made for the successor state of exit location OUTi. The external assumption is the first argument of intAi and intGi.

For the temporal formulae PHI of the form EX phi the guarantee intGi encodes whether PHI holds in a location, and the assumption intAi encodes whether phi is assumed to be true in the first location of a box.

For the other types of temporal formulae, EG phi and E phi U psi, the guarantee and the assumption are both about the validity of PHI; whether it is guaranteed to hold in a location, or assumed to be true in a box. For example, suppose intGi maps (T3,INi) to T3. This means that if we assume that PHI is true in a successor of OUTi then it is guaranteed that PHI is true in INi The value M3 is used to represent that either a substructure has not been evaluated yet for a given assumption, or that the result is still inconclusive. The latter can happen if the result depends on other inconclusive or unevaluated summaries. The assumptions and guarantees given external assumption M3 are the combined assumptions and guarantees for T3 and F3. This combination is defined by the join-operator.

Definition of Associated Kripke Structure

Given a sub-structure Ai=(LOCSi, INi, OUTi, BOXESi, TRANSi, LABELi, REFi) over AP={phi, psi}, a summary si=(intAi, intGi), and an external assumption extA from TERNARY.

The associated Kripke structure K(Ai, intAi, extA) is a transition system with
states LOCSi U BOXESi U locf}
initial state INi
transition relation TRANSi U OUTi,locf), (locf,locf)}
labeling function LABELi' with LABELi'(s)=LABELi(s) if s from LOCSi, LABELi'(s)=intAi(extA,s)} ifs from BOXESi, and LABELi'(locf)={extA}

The extra state locf denotes the successor of the exit state OUTi and any other state that might follow. Note that the labeling of states with values from TERNARY is interpreted in Boolean logic, i.e. T3 is either in LABELi'(s) or not. CTL formulae for the associated Kripke Structure have the usual (Boolean) interpretation.

A summary si will be called coherent if a guarantee is T3 for a location loc, then loc does satisfy the property PHI, and if guarantee is F3 it does not. Coherence, of course, depends on the assumptions made about the boxes.

Definition of Locally Coherent Summary

Given a sub-structure Ai=(LOCSi, INi, OUTi, BOXESi, TRANSi, LABELi, REFi) over AP={phi,psi}, and a CTL formula PHI from EX phi, EG phi, E phi U psi}. Let si=(intAi, intGi) be an summary. We call si locally coherent if it satisfies for all extA from TERNARY the following:
Case PHI=EX phi
1. For all loc from LOCSi we have
if intGi(t,l)=T3 then
K(Ai,intAi,extA), $loc \vdash$ EX phi or EX T3
2. For all loc from LOCSi we have
if intGi(extA,loc)=F3 then
K(Ai,intAi,extA), $loc \vdash$ not EX phi or not EX T3
Case PHI=EG phi or PHI=E phi U psi
1. For all loc from LOCSi we have
if intGi(extA,loc)=T3 then
K(Ai,intAi,extA), $loc \vdash$ PHI or E phi U T3
2. For all loc from LOCSi we have
if intGi(extA,loc)=F3 then
K(Ai,intAi,extA), $loc \vdash$ not(PHI or EphiUT3 or E phi U M3)

In the case of PHI=EX phi states are labeled with T3, if phi is true in a successor location or assumed to be true in a successor box. Otherwise it is labeled F3. Note that phi is assumed to be atomic proposition i.e. that EX phi is either true or false.

The other two cases are more complicated, since both temporal operators define a property for an infinite path. The first requirement in these cases ensures that only states are labeled locally with T3 if they either satisfy EG phi or there exists a path to an assumption T3. The latter requirement is motivated by the equivalences EG phi=E phi U (EG phi) and E phi U psi=E phi U (E phi U psi). The second requirement analogously covers the case that a location is labeled F3, in which no path to an assumption T3 or M3 should exist.

The following should be noted
1. Local coherence puts no restriction on the labeling of boxes.
2. A summary with the constant assumption function that maps all boxes to M3 is trivially coherent.

A summary si is called maximally coherent when all implications in the Definition of Locally Coherent Summaries are equivalence. This means, for example, that location loc is labeled T3 for EX phi if and only if K(Ai,si,extA), $loc \vdash$ EX phi.

Definition of Consistent Summaries

Given an RKS (A0, . . . , An) with sub-structures Ai=(LOCSi, INi, OUTi, BOXESi, TRANSi, LABELi, REFi) over AP={phi,psi}, and a CTL formula PHI from {EX phi, EG phi, E phi U psi}, and a collection of summaries S=(s0, . . . , sn), with local summaries si=(intAi, intGi). We call S consistent if it satisfies the following for all i from 0, . . . , n:

For all box from BOXESi, extA from TERNARY, with j=REFi(box) holds
Case: PHI=EX $$\text{intA}i(\text{extA},\text{box}) = \text{to}(phi U \text{LABEL}j(\text{IN}j)) \quad (4)$$

Case: PHI=EG phi or PHI=E phi U psi $$\{t0, \ldots, tk\} = \{t U LOCSi | TRANSi(box, t)\}$$

and $$\text{extG}(\text{extA},\text{box}) = \text{intG}i(\text{extA},t0) \text{ or } \ldots \text{ or } \text{intG}i(\text{extA}, tk)$$

and $$\text{intA}i(\text{extA},b) = \text{intG}j(\text{extG}(\text{extA},\text{box}),\text{IN}j)$$

For the case PHI=EX phi consistency requires that the assumption is T3 iff the entry state INj of Aj is labeled phi, otherwise it will be F3.

Consistency for the other cases requires that the assumption in Ai matches with the guarantees given for the callee Aj. The set {t0, . . . , tk} are the successors of box. The guarantee extG(extA,box) is the or of the guarantees intGi in all the successors of box. This will be used as external assumption for sub-structure Aj.

The term intAi(extA,box) is the label on box. It is required that this label is the same as the internal guarantee intGj in entry location INj, given extG.

Definition of Sub-Formula Labelling

Given an RKS (A0, . . . , An) and a sub formula phi we define sub formula labeling Σ-for-phi as a tuple of pairs ((LABELSET0-for-phi, REFSET0-for-phi), . . . , (LABELSETn-for-phi, REFSETn-for-phi)) as follows:

Every LABEL[i,j] from LABELSET0-for-phi is a mapping from location LOCSi to labels {{phi},{ }}. Every REF [i,j] from REFSET0-for-phi is a mapping from BOXESi to an index pair [i,j].

Given an RKS A=(A0, ..., An) and a labeling Σ-for-phi we can create an new RKS with sub-structures A[i,j] over atomic propositions {{phi},{ }}, by substituting LABELi and REFi in Ai with LABEL[i,j] from LABELSETi-for-phi and REF[i, j] from REFSETi-for-phi. We refer to this operation as rks(A, Σ-for-phi).

Given a sub-formula labeling Σ-for-phi and Σ-for-psi for sub-formulae phi and psi the necessary operations amount to operations on the sub-formula labeling. There are two important operators on sub-formula, one that introduces new labeling, given a summary S-of-PHI, and one that merges the labeling Σ-for-phi and Σ-for-psi for sub-formulae phi and psi. The latter is necessary as a precursor for the binary CTL operators or and EU.

REFERENCES

[1] Edmund M. Clarke and E. Allen Emerson. Design and synthesis of synchronization skeletons for branching time temporal logic. In Dexter Kozen, editor, *Logics of Programs Worksh. op*, IBM Watson Research. Center, Yorktown Heights, N.Y., May 1981, volume 131 of LNCS, pages 52-71. Springer Verlag, 1982.

[2] D. Dams and K. S. Namjoshi. Orion: High-precision methods for static error analysis of C and C++ programs. Bell Labs Tech. Mem. ITD-04-45263Z, Lucent Technologies, 2004.

[3] A. Fehnker, R. Huuck, P. Jayet, M. Lussenburg, and F. Rauch. Model checking software at compile time. In *Proc. TASE* 2007. IEEE Computer Society, 2007.

[4] G. J. Holzmann. Static source code checking for user-defined properties. In *Proc. IDPT* 2002, Pasadena, Calif., USA, June 2002.

[5] Jean-Pierre Queille and Joseph Sifakis. Specification and verification of concurrent systems in CESAR. In M. Dezani-Ciancaglini and U. Montanari, editors, *Proc. Intl. Symposium on Programming, Turin*, Apr. 6-8, 1982, pages 337-350. Springer Verlag, 1982.

[6] David A. Schmidt and Bernhard Steffen. Program analysis as model checking of abstract interpretations. In *Proc. SAS '98*, pages 351-380. Springer-Verlag, 1998.

The invention claimed is:

1. A computer method for the inter-procedural checking of source code, comprising:
receiving source code comprising a list of functions;
expressing a required inter-procedural check as a formula expressed in computational tree logic (CTL) syntax;
decomposing the computational tree logic (CTL) syntax of the inter-procedural check into sub-formulae;
automatically mapping the functions of the source code to respective sub-structures of an associated recursive Kripke structure, wherein the sub-structures call other substructures, and wherein each sub-structure comprises the following states:
an entry location having internal guarantees,
other locations representing code statements having respective internal guarantees,
boxes that model calls to other functions, having respective internal assumptions and external guarantees,
and an exit location having internal guarantees and external assumptions;
wherein there are transitions between adjacent locations and boxes that map a value from an precursor location or box to a successor location or box;
generating a summary for each substructure capable of being represented as a table wherein each row represents a location, box or the external assumptions of the sub-structure, and wherein each row comprises three values that respectively represent:
whether the summary is an assumption for a box, a guarantee for a location or external assumptions,
whether the current sub-formula is true, false or undetermined at that state when a first external assumption of that substructure is assumed to be false,
and whether the current sub-formula is true, false or undetermined at that state when the other external assumption of that substructure is assumed to be true;
then, starting with the simplest sub-formula, refining the summaries by:
(i) applying computational tree logic (CTL) model checking to each sub-structure to check whether the each guarantee is true, false or undetermined for each external assumption and updating the corresponding values of the summary accordingly, then
(ii) checking whether the internal assumptions of each box are consistent with the first internal guarantees of the callee sub-structure, and whether the external assumptions are consistent with the external guarantees of the caller sub-structure and updating the corresponding values of the summary accordingly, then,
(iii) iteratively repeating steps (i) and (ii) until no further refinement of the sub-formula is possible;
then iteratively repeating steps (i), (ii) and (iii) for each sub-formula in increasing complexity, until no further refining is possible for the most complex sub-formula, and therefore the entire formula.

2. A method for the inter-procedural checking of source code according to claim 1, wherein after the method terminates and there are values in the summary that have not been resolved as true or false, but remain undetermined; comprising resolving the remaining undetermined values by applying rules to allocate true or false values.

3. A method for the inter-procedural checking of source code according to claim 1, comprising the step of initialization of the method by setting the value of every state of the summary to 'undetermined'.

4. A method for the inter-procedural checking of source code according to claim 1, wherein, when checking involves nested formulae, replacing the single values true, false and undetermined by a set of values that also record the callee sub-structure.

5. A method for the inter-procedural checking of source code according to claim 4, further comprising the step of introducing new sets of values having more values.

6. A method for the inter-procedural checking of source code according to claim 5, further comprising the step of merging sets of values into new sets with fewer values.

7. A method for the inter-procedural checking of source code according to claim 5, further comprising the step of checking of sub-formulae when there are nested formulae by checking the sub-formulae bottom up from atomic propositions to the complete formula.

8. A computer programmed to conduct inter-procedural checking of source code, comprising:
an input port to receive source code comprising a list of functions;

a processor to:

express a required inter-procedural check as a formula expressed in computational tree logic (CTL) syntax;

decompose the computational tree logic (CTL) syntax of the inter-procedural check into sub-formulae;

automatically map the functions of the source code to respective sub-structures of an associated recursive Kripke structure, wherein the sub-structures call other substructures, and wherein each sub-structure comprises the following states:

an entry location having internal guarantees, other locations representing code statements having respective internal guarantees, boxes that model calls to other functions, having respective internal assumptions and external guarantees, and an exit location having internal guarantees and external assumptions;

wherein there are transitions between adjacent locations and boxes that map a value from an precursor location or box to a successor location or box;

wherein the processor also generates a summary for each substructure capable of being represented as a table wherein each row represents a location, box or the external assumptions of the substructure, and wherein each row comprises three values that respectively represent: whether the summary is an assumption for a box, a guarantee for a location or external assumptions, whether the current sub-formula is true, false or undetermined at that state when a first external assumption of that substructure is assumed to be false, and whether the current sub-formula is true, false or undetermined at that state when the other external assumption of that substructure is assumed to be true;

then, starting with the simplest sub-formula, the processor operates to refine the summaries by:

(i) applying computational tree logic (CTL) model checking to each sub-structure to check whether the each guarantee is true, false or undetermined for each external assumption and updating the corresponding values of the summary accordingly; then, (ii) checking whether the internal assumptions of each box are consistent with the first internal guarantees of the callee sub-structure, and whether the external assumptions are consistent with the external guarantees of the caller sub-structure and updating the corresponding values of the summary accordingly; then, (iii) iteratively repeating steps (i) and (ii) until no further refinement of the sub-formula is possible;

then the processor iteratively repeating steps (i), (ii) and (iii) for each sub-formula in increasing complexity, until no further refining is possible for the most complex sub-formula, and therefore the entire formula.

* * * * *